United States Patent
Ma et al.

(10) Patent No.: US 11,659,569 B2
(45) Date of Patent: May 23, 2023

(54) RATE MATCHING FOR PIGGYBACK DOWNLINK CONTROL INFORMATION

(71) Applicant: QUALCOMM Incorporated, San Diego, CA (US)

(72) Inventors: Jun Ma, San Diego, CA (US); Qiang Wu, San Diego, CA (US); Mehmet Izzet Gurelli, San Diego, CA (US); Iyab Issam Sakhnini, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/301,729

(22) Filed: Apr. 13, 2021

(65) Prior Publication Data

US 2021/0345392 A1 Nov. 4, 2021

Related U.S. Application Data

(60) Provisional application No. 63/017,527, filed on Apr. 29, 2020.

(51) Int. Cl.
*H04L 1/00* (2006.01)
*H04L 27/26* (2006.01)
*H04W 72/1273* (2023.01)
*H04W 72/23* (2023.01)

(52) U.S. Cl.
CPC .......... *H04W 72/23* (2023.01); *H04L 1/0013* (2013.01); *H04L 27/2601* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 10,313,990 | B2* | 6/2019 | Sadeghi | H04W 56/00 |
| 10,362,596 | B2* | 7/2019 | You | H04W 72/0446 |
| 11,411,690 | B2* | 8/2022 | Moon | A61H 23/006 |

(Continued)

OTHER PUBLICATIONS

3GPP TSG RAN WG1 #100bis. Apple. "On remaining Details of NR V2X Physical Layer Structure." Apr. 20-30, 2020. (Year: 2020).*

(Continued)

*Primary Examiner* — Andrew C Oh
(74) *Attorney, Agent, or Firm* — Harrity & Harrity, LLP

(57) ABSTRACT

Various aspects of the present disclosure generally relate to wireless communication. In some aspects, a user equipment may determine a number of resource elements (REs) associated with downlink control information (DCI) that is to be carried on a physical downlink shared channel (PDSCH) with a shared channel, wherein the number of REs associated with the DCI is determined based at least in part on a scaling factor and a number of REs associated with the shared channel; determine a transport block size (TBS) for the shared channel based at least in part on a remaining number of REs, of the number of REs associated with the shared channel, wherein the remaining number of REs is based at least in part on the number of REs associated with the DCI; and receive the PDSCH based at least in part on the TBS for the shared channel. Numerous other aspects are provided.

26 Claims, 6 Drawing Sheets

(56) References Cited

U.S. PATENT DOCUMENTS

| | | | | |
|---|---|---|---|---|
| 2011/0243066 | A1* | 10/2011 | Nayeb Nazar | H04W 72/0446 370/328 |
| 2011/0249578 | A1* | 10/2011 | Nayeb Nazar | H04L 5/0053 370/252 |
| 2015/0312074 | A1* | 10/2015 | Zhu | H04L 1/0026 370/329 |
| 2018/0110062 | A1* | 4/2018 | Byun | H04L 5/0053 |
| 2018/0124753 | A1* | 5/2018 | Sun | H04L 1/0088 |
| 2019/0082431 | A1* | 3/2019 | Yi | H04L 5/0053 |
| 2019/0103944 | A1* | 4/2019 | Wu | H04L 1/0052 |
| 2019/0150179 | A1* | 5/2019 | Soriaga | H04L 5/0094 370/329 |
| 2019/0158252 | A1* | 5/2019 | Li | H04W 76/27 |
| 2020/0077414 | A1* | 3/2020 | Ye | H04L 1/0013 |
| 2020/0213863 | A1* | 7/2020 | Wu | H04L 1/1812 |
| 2020/0296728 | A1* | 9/2020 | Yoshimura | H04L 5/0044 |
| 2020/0412431 | A1* | 12/2020 | Park | H04B 7/0469 |
| 2021/0045181 | A1* | 2/2021 | Li | H04J 11/00 |
| 2021/0266111 | A1* | 8/2021 | Kusashima | H04L 1/1819 |
| 2021/0298052 | A1* | 9/2021 | Namba | H04L 1/1851 |
| 2021/0314984 | A1* | 10/2021 | Yang | H04L 5/0044 |

OTHER PUBLICATIONS

Apple: "On Remaining Details of NR V2X Physical Layer Structure", 3GPP Draft, 3GPP TSG RAN WG1 #100bis, R1-2002323, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), pp. 1-10, XP051875543, Retrieved from the Internet: URL: https://ftp.3gpp.org/tsg_ran/WG1_RL1/TSGR1_100b_e/Docs/R1-2002323.zip. R1-2002323, On Remaining Details of NR V2X Physical Layer Structure.docx [Retrieved on Apr. 11, 2020] section 2.1.

AT&T: "Two Stage DCI Design for NR DL Control Channel", 3GPP Draft, 3GPP TSG RAN WG1 Meeting #88, R1-1702274, Two Stage DCI Design for NR DL Control Channel, 3rd Generation Partnership Project (3GPP), Mobile Competence Centre, 650, Route Des Lucioles, F-06921 Sophia-Antipolis Cedex, vol. RAN WG1, No. Athens. Greece, Feb. 13, 2017-Feb. 17, 2017, Feb. 12, 2017 (Feb. 12, 2017), XP051209429, 6 Pages, Retrieved from the Internet: URL: http://www.3gpp.org/ftp/Meetings_3GPP_SYNC/RAN1/Docs/. [retrieved on Feb. 12, 2017] figure 2.

Huawei, et al., "DCI Contents in NR and Two-Stage DCI Designs", 3GPP Draft, 3GPP TSG RAN WG1 Meeting #89, R1-1706949, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017 (May 14, 2017), XP051272179, 6 Pages, Retrieved from the Internet: URL: http://www.3gpp.org/ftp/Meetings_3GPP_SYNC/RAN1/Docs/. [retrieved on May 14, 2017] section 2.2.

International Search Report and Written Opinion—PCT/US2021/070389—ISA/EPO—dated Jul. 7, 2021.

ITRI: "Discussion on Two-Stage DCI for NR", 3GPP Draft, 3GPP TSG-RAN WG1 Meeting #89, R1-1708717, Discussion on Two-Stage DCI for NR, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 14, 2017 (May 14, 2017), XP051273900, 4 Pages, Retrieved from the Internet: URL: http://www.3gpp.org/ftp/Meetings_3GPP_SYNC/RAN1/Docs/ [Retrieved on May 14, 2017] Sections 1 and 2.

Samsung: "On Physical Layer Structures for NR Sidelink", 3GPP Draft, 3GPP TSG RAN WG1 #100bis-e Meeting, R1-2002689, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 16, 2020 (Apr. 16, 2020), XP051876558, 10 Pages, Retrieved from the Internet: URL: https://ftp.3gpp.org/tsg_ran/WG1_RL1/TSGR1_100b_e/Docs/R1-2002689.zip. R1-2002689. On Physical Layer Structures for NR V2X.docx [Retrieved on Apr. 16, 2020], section 2.4.

* cited by examiner

RATE MATCHING FOR PIGGYBACK DOWNLINK CONTROL INFORMATION

CROSS-REFERENCE TO RELATED APPLICATION

This patent application claims priority to U.S. Provisional Patent Application No. 63/017,527, filed on Apr. 29, 2020, entitled "RATE MATCHING FOR PIGGYBACK DOWNLINK CONTROL INFORMATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for rate matching for piggyback downlink control information (DCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include determining a number of resource elements (REs) associated with downlink control information (DCI) that is to be carried on a physical downlink shared channel (PDSCH) with a shared channel, wherein the number of REs associated with the DCI is determined based at least in part on a scaling factor and a number of REs associated with the shared channel; determining a transport block size (TBS) for the shared channel based at least in part on a remaining number of REs, of the number of REs associated with the shared channel, wherein the remaining number of REs is based at least in part on the number of REs associated with the DCI; and receiving the PDSCH based at least in part on the TBS for the shared channel.

In some aspects, a method of wireless communication, performed by a base station, may include determining a number of REs associated with DCI that is to be carried on a PDSCH with a SCH, wherein the number of REs associated with the DCI is determined based at least in part on a scaling factor and a number of REs associated with the shared channel; determining a TBS for the shared channel based at least in part on a remaining number of REs, of the number of REs associated with the shared channel, wherein the remaining number of REs is based at least in part on the number of REs associated with the DCI; and transmitting the PDSCH based at least in part on the TBS for the shared channel.

In some aspects, a user equipment for wireless communication may include a memory and one or more processors operatively coupled to the memory. The memory and the one or more processors may be configured to determine a number of REs associated with DCI that is to be carried on a PDSCH with a shared channel, wherein the number of REs associated with the DCI is determined based at least in part on a scaling factor and a number of REs associated with the shared channel; determine a TBS for the shared channel based at least in part on a remaining number of REs, of the number of REs associated with the shared channel, wherein the remaining number of REs is based at least in part on the number of REs associated with the DCI; and receive the PDSCH based at least in part on the TBS for the shared channel.

In some aspects, a base station for wireless communication may include a memory and one or more processors operatively coupled to the memory. The memory and the one or more processors may be configured to determine a number of REs associated with DCI that is to be carried on a PDSCH with a SCH, wherein the number of REs associated with the DCI is determined based at least in part on a scaling factor and a number of REs associated with the shared channel; determine a TBS for the shared channel based at least in part on a remaining number of REs, of the number of REs associated with the shared channel, wherein the remaining number of REs is based at least in part on the number of REs associated with the DCI; and transmit the PDSCH based at least in part on the TBS for the shared channel.

In some aspects, a non-transitory computer-readable medium may store one or more instructions for wireless communication. The one or more instructions, when executed by one or more processors of a UE, may cause the one or more processors to determine a number of REs associated with DCI that is to be carried on a PDSCH with a shared channel, wherein the number of REs associated with the DCI is determined based at least in part on a scaling factor and a number of REs associated with the shared channel; determine a TBS for the shared channel based at least in part on a remaining number of REs, of the number of REs associated with the shared channel, wherein the remaining number of REs is based at least in part on the number of REs associated with the DCI; and receive the PDSCH based at least in part on the TBS for the shared channel.

In some aspects, a non-transitory computer-readable medium may store one or more instructions for wireless communication. The one or more instructions, when executed by one or more processors of a base station, may cause the one or more processors to determine a number of REs associated with DCI that is to be carried on a PDSCH with a SCH, wherein the number of REs associated with the DCI is determined based at least in part on a scaling factor and a number of REs associated with the shared channel; determine a TBS for the shared channel based at least in part on a remaining number of REs, of the number of REs associated with the shared channel, wherein the remaining number of REs is based at least in part on the number of REs associated with the DCI; and transmit the PDSCH based at least in part on the TBS for the shared channel.

In some aspects, an apparatus for wireless communication may include means for determining a number of REs associated with DCI that is to be carried on a PDSCH with a shared channel, wherein the number of REs associated with the DCI is determined based at least in part on a scaling factor and a number of REs associated with the shared channel; means for determining a TBS for the shared channel based at least in part on a remaining number of REs, of the number of REs associated with the shared channel, wherein the remaining number of REs is based at least in part on the number of REs associated with the DCI; and means for receiving the PDSCH based at least in part on the TBS for the shared channel.

In some aspects, an apparatus for wireless communication may include means for determining a number of REs associated with DCI that is to be carried on a PDSCH with a SCH, wherein the number of REs associated with the DCI is determined based at least in part on a scaling factor and a number of REs associated with the shared channel; means for determining a TBS for the shared channel based at least in part on a remaining number of REs, of the number of REs associated with the shared channel, wherein the remaining number of REs is based at least in part on the number of REs associated with the DCI; and means for transmitting the PDSCH based at least in part on the TBS for the shared channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
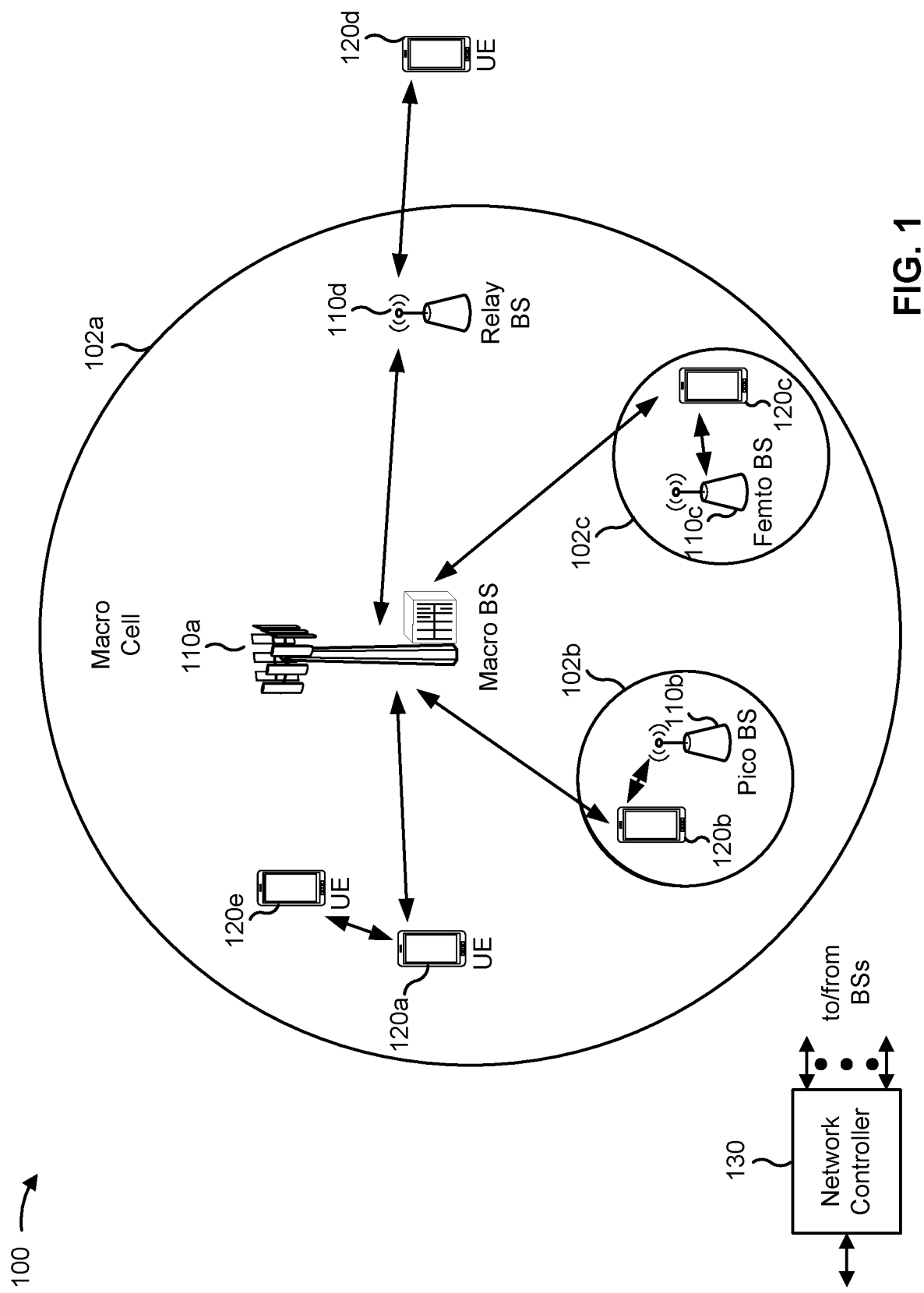
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
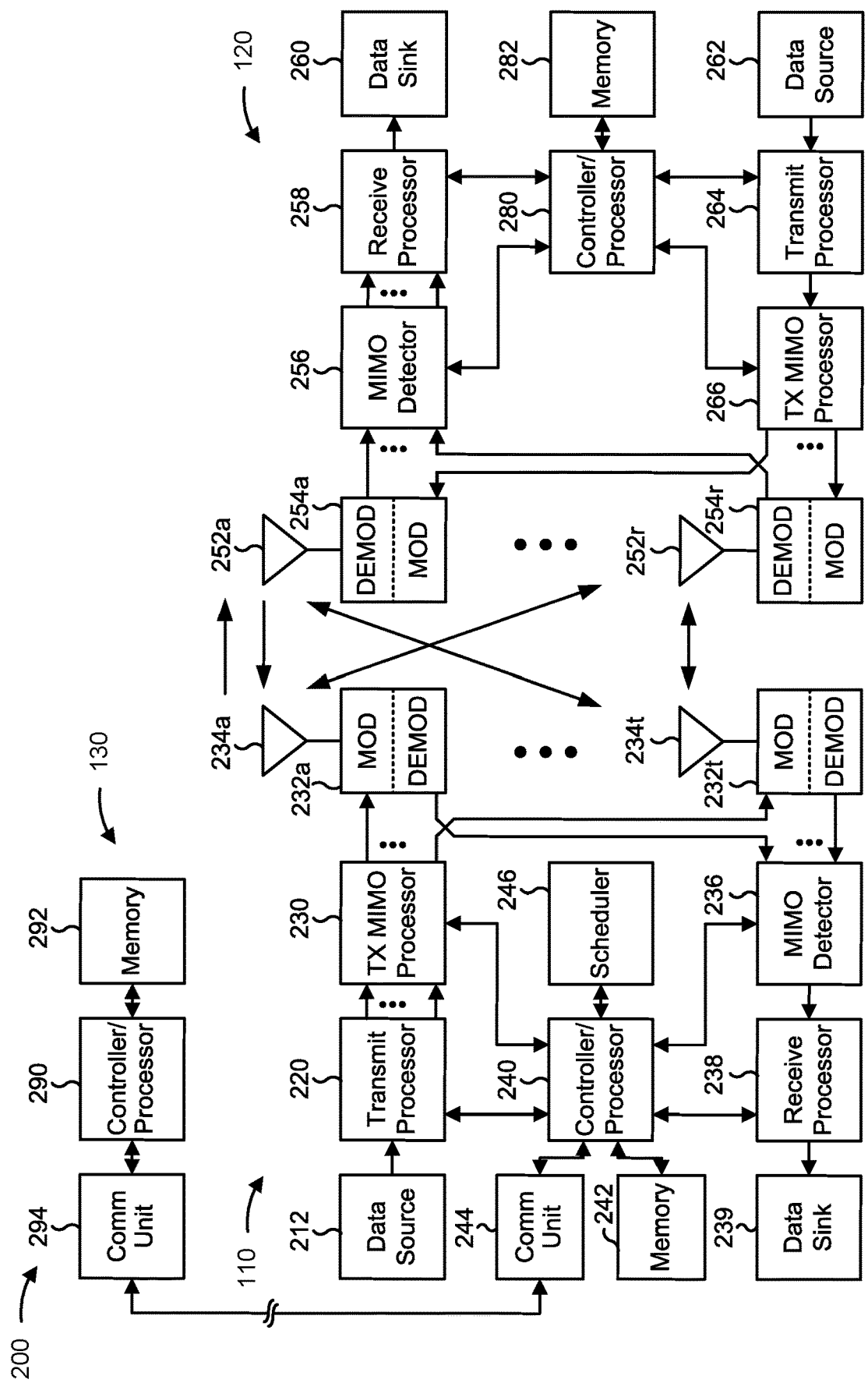
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with rate matching for piggyback DCI, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for determining a number of resource elements (REs) associated with downlink control information (DCI) that is to be carried on a physical downlink shared channel (PDSCH) with a shared channel, wherein the number of REs associated with the DCI is determined based at least in part on a scaling factor and a number of REs associated with the shared channel; means for determining a transport block size (TBS) for the shared channel based at least in part on a remaining number of REs, of the number of REs associated with the shared channel, wherein the remaining number of REs is based at least in part on the number of REs associated with the DCI; means for receiving the PDSCH based at least in part on the TBS for the shared channel; means for receiving information identifying the scaling factor; means for determining an initial TBS based at least in part on the number of REs associated with the shared channel, wherein the number of REs associated with the DCI is based at least in part on the initial TBS; means for determining the number of REs associated with the DCI based at least in part on combining the scaling factor, a payload size of the DCI, and a payload size of the shared channel; means for determining an initial TBS based at least in part on the number of REs associated with the shared channel and an MCS of the shared channel; means for determining the remaining number of REs by subtracting the number of REs associated with the DCI from the number of REs associated with the shared channel; means for determining a size for a code block based at least in part on the initial TBS; means for receiving DCI scheduling the shared channel, wherein the number of REs associated with the shared channel is indicated by the DCI scheduling the shared channel; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a number of REs associated with DCI that is to be carried on a PDSCH with an SCH, wherein the number of REs associated with the DCI is determined based at least in part on a scaling factor and a number of REs associated with the shared channel; means for determining a TBS for the shared channel based at least in part on a remaining number of REs, of the number of REs associated with the shared channel, wherein the remaining number of REs is based at least in part on the number of REs associated with the DCI; means for transmitting the PDSCH based at least in part on the TBS for the shared channel; means for transmitting information identifying the scaling factor; means for determining an initial TBS based at least in part on the number of REs associated with the shared channel, wherein the number of REs associated with the DCI is based at least in part on the initial TBS; means for determining the number of REs associated with the DCI based at least in part on combining the scaling factor, a payload size of the DCI, and a payload size of the shared channel; means for determining an initial TBS based at least in part on the number of REs associated with the shared channel and an MCS of the shared channel; means for determining the remaining number of REs by subtracting the number of REs associated with the DCI from the number of REs associated with the shared channel; means for determining a size for a code block based at least in part on the initial TBS; means for transmitting DCI scheduling the shared channel, wherein the number of REs associated with the shared channel is indicated by the DCI scheduling the shared channel; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

DCI is traditionally transmitted to a UE on a physical downlink control channel (PDCCH) in a control resource set (CORESET). This may involve blind decoding, because a UE is given all the information required to decode a PDCCH (e.g., the resource allocation of PDCCH, the aggregation level, and so on), and may use this information to decode according to multiple blind decoding hypotheses until a PDCCH for the UE is discovered. In some cases, DCI, or some part of a DCI, can be transmitted on a PDSCH. This is referred to as a piggyback or piggybacked DCI. The information used to decode the piggyback DCI, such as a resource allocation for the piggyback DCI, may be known to the UE based at least in part on another DCI, which may be provided prior to the piggyback DCI. Thus, blind decoding is not required for the piggyback DCI, a higher MCS level can be used for the piggyback DCI, and a larger payload and/or more DCIs can be sent in a given set of resources.

Piggyback DCI may be associated with a variable payload size, which can sometimes be large. While a piggyback DCI with a small payload may have a relatively small impact on the PDSCH that carries the piggyback DCI, a larger payload or multiple piggyback DCIs may increase the code rate of the PDSCH, leading to a higher block error rate (BLER). A higher BLER leads to increased communication resource usage associated with retransmission of piggyback DCI and/or PDSCHs. Furthermore, the BLER impact of the piggyback DCI may be greater than a BLER impact of other piggyback control information, such as piggyback uplink control information (UCI), so a piggyback UCI's rate matching procedure may be unsuitable for piggyback DCI.

Some techniques and apparatuses described herein provide rate matching of a PDSCH that carries one or more piggyback DCI based at least in part on a parameter referred to herein as a scaling factor (e. g., $\beta_{offset}$). The scaling factor may indicate a portion of available PDSCH REs to be allocated for piggyback DCI. A UE or base station may determine a scaled number of REs of a PDSCH using the scaling factor, and may modify a TBS for the PDSCH in accordance with the scaled number of REs. Thus, the UE or the base station may take into account a scaling factor to determine a TBS for a PDSCH, thereby reducing the BLER associated with piggyback DCI, particularly piggyback DCI with large payloads or groups of multiple piggyback DCI on a PDSCH. Thus, communication resource usage of the UE and the base station is reduced relative to transmitting PDSCHs at a higher potential BLER.

Figure 3:
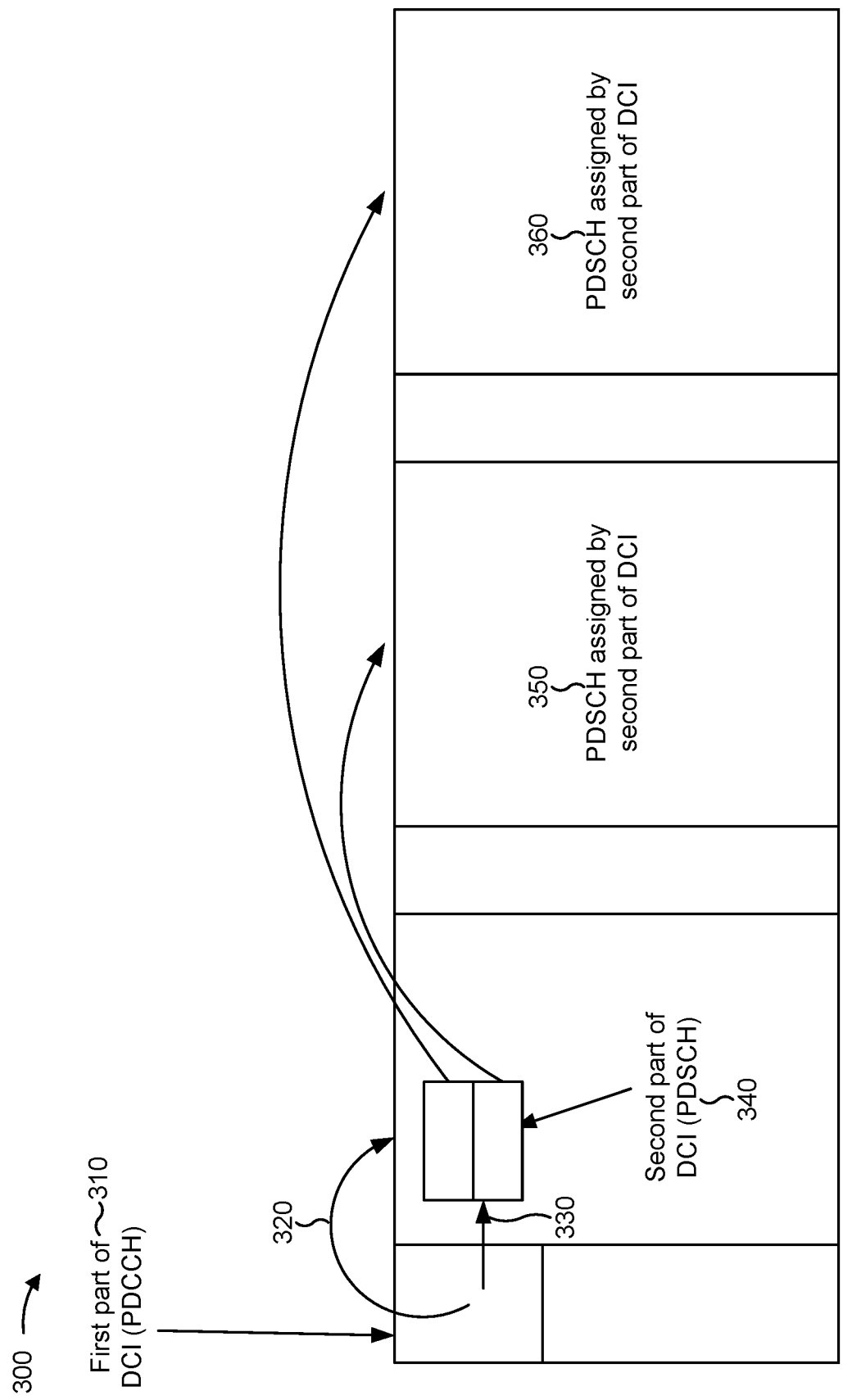
FIG. 3 is a diagram illustrating an example of piggyback DCI, in accordance with the present disclosure.

FIG. 3 is a diagram illustrating an example 300 of piggyback DCI, in accordance with the present disclosure. A first part of DCI (e.g., a first DCI message), shown by reference number 310, is provided on a PDCCH. For example, the UE may intermittently monitor the PDCCH (e.g., on a subset of PDCCHs, such as every N PDCCHs where N is an integer). The first part of the DCI may include information for decoding a PDSCH that is to carry one or more piggyback DCI, as indicated by the arrow from the first part of the DCI to the PDSCH. For example, in Type 1, the first part of the DCI may include scheduling information or a grant for a PDSCH and scheduling information for the second part of the DCI in the PDSCH (as indicated by the arrow from the first part of the DCI to the second part of the DCI shown by reference number 330). The second part of the DCI, shown by reference number 340, may include scheduling information for one or more subsequent PDSCHs. For example, the one or more piggyback DCI may include respective DCI that carry information for decoding subsequent PDSCHs (e.g., scheduling information and/or the like), shown by reference numbers 350 and 360. Some techniques and apparatuses described herein include rate matching of the PDSCH associated with the second part of the DCI in accordance with a scaling factor, as described in more detail in connection with FIGS. 4-6.

As indicated above, FIG. 3 is provided as an example. Other examples may differ from what is described with respect to FIG. 3.

Figure 4:
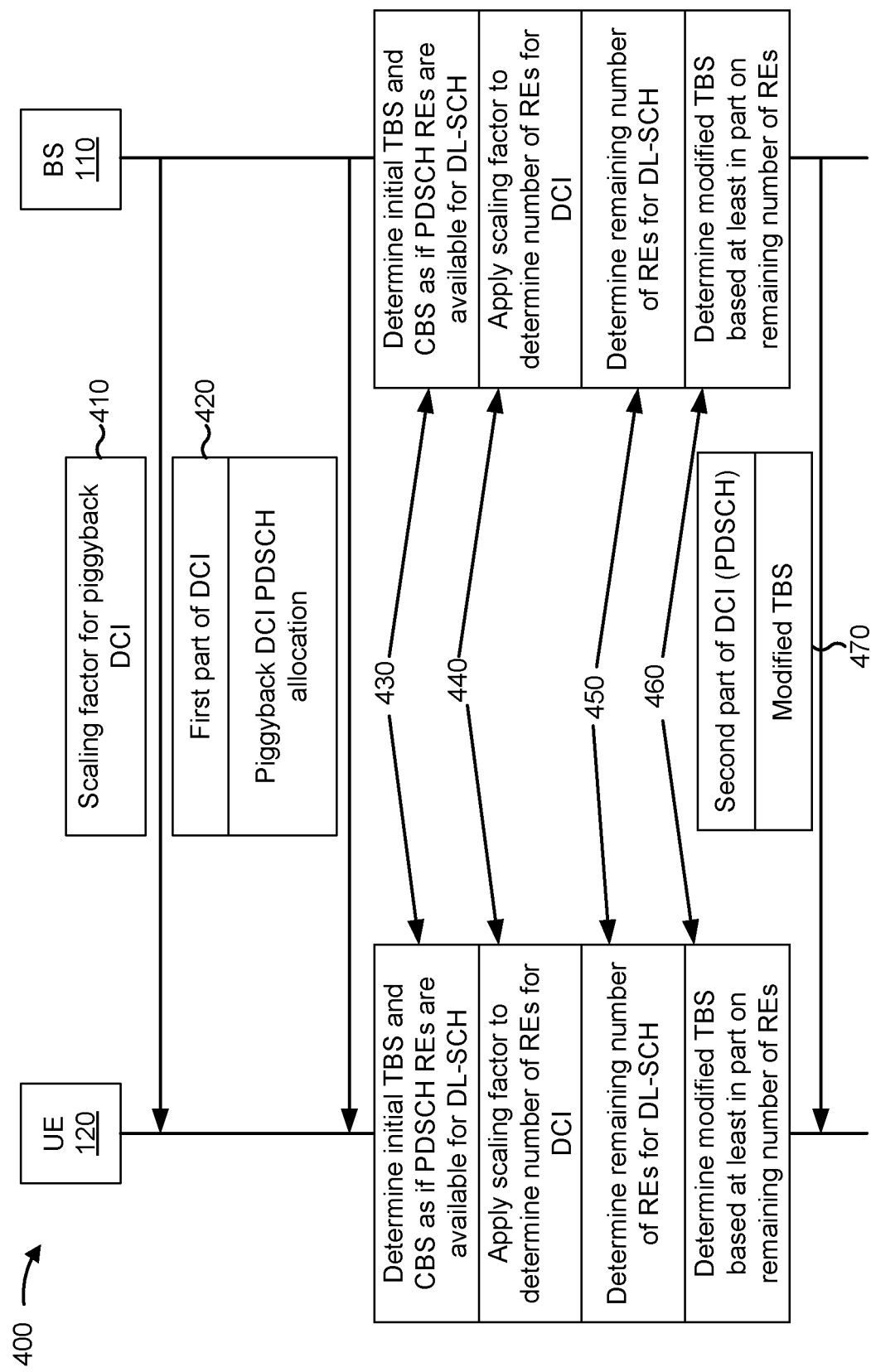
FIG. 4 is a diagram illustrating an example of transmission of piggyback DCI in accordance with a scaling factor, in accordance with the present disclosure.

FIG. 4 is a diagram illustrating an example 400 of transmission of piggyback DCI in accordance with a scaling factor, in accordance with the present disclosure. As shown, example 400 includes a UE 120 and a BS 110.

As shown by reference number 410, the BS 110 may transmit, and the UE 120 may receive, a scaling factor for piggyback DCI. The scaling factor may be represented by $\beta_{offset}$. The scaling factor may be used to determine a modified TBS for a PDSCH that carries the piggyback DCI, as described in more detail below. In some aspects, the scaling factor may be transmitted using radio resource control (RRC) signaling or another form of semi-static signaling. In some aspects, the scaling factor may be provided in DCI, such as a first part of DCI (as described in connection with FIG. 3) in a CORESET associated with the PDSCH.

As shown by reference number 420, the BS 110 may transmit, and the UE 120 may receive, the first part of the DCI. In some aspects, the first part of the DCI may indicate the scaling factor. In other aspects, the first part of the DCI may be transmitted separately from the information indicating the scaling factor. As further shown, the first part of the DCI may indicate a piggyback DCI PDSCH allocation. For example, the first part of the DCI may schedule the PDSCH, and may indicate resources and/or parameters associated with the piggyback DCI (e.g., the second part of the DCI). The PDSCH may be associated with a downlink shared channel (DL-SCH), which may carry data to be transmitted on the PDSCH. Some techniques and apparatuses described herein indicate how to determine rate matching for REs of the PDSCH so that the DL-SCH can be transmitted with a lower BLER than if puncturing or another form of combined resource allocation is used for the piggyback DCI and the PDSCH.

Reference numbers 430, 440, 450, and 460 show a procedure for determining a modified TBS for the DL-SCH based at least in part on the scaling factor. In other words, the procedure is for rate matching the PDSCH around the piggyback DCI.

As shown by reference number 430, the UE 120 and/or the BS 110 may determine an initial TBS and code block size (CBS) as if all PDSCH REs are available for the DL-SCH. For example, the UE 120 may determine the initial TBS and CBS as if no piggyback DCI is to be transmitted on the PDSCH. The initial TBS may be a function of an MCS and a number of REs ($N_{RE}$), where $N_{RE}$ is indicated by the DCI that schedules the PDSCH. Generally, the UE 120 and/or the BS 110 may determine the initial TBS using a formula specified by a wireless communication specification.

As shown by reference number 440, the UE 120 and/or the BS 110 may apply the scaling factor to determine a number of REs for the piggyback DCI ($N_{RE,DCI}$). For example, the UE 120 or the BS 110 may determine the number of REs for the piggyback DCI based at least in part on combining the scaling factor, the number of REs of the PDSCH, and respective numbers of bits of the piggyback DCI and the DL-SCH. Generally, this determination may be represented as $$N_{RE,DCI} = \frac{K_{DCI} \cdot \beta_{offset}}{K_{DL-SCH}} N_{RE},$$

wherein $K_{DL-SCH}$ is a number of bits for the DL-SCH derived from the TBS, and $K_{DCI}$ is the DCI payload size.

In some aspects, the UE 120 and/or the BS 110 may determine $N_{RE,DCI}$ to occupy one or more entire resource blocks (RBs). For example, the UE 120 and/or the BS 110 may determine $N_{RE,DCI}$ as a multiple of an RB size (e.g., 12) so that DCI and DL-SCH REs do not share an RB. This may simplify transmission or reception of the piggyback DCI, thereby conserving communication resources.

As shown by reference number 450, the UE 120 and/or the BS 110 may determine a remaining number of REs for the DL-SCH ($N_{RE}'$). For example, the UE 120 and/or the BS 110 may determine the remaining number of REs based at least in part on the initial number of REs and the number of REs associated with the DCI, such as based at least in part on the equation $N_{RE}' = N_{RE} - N_{RE,DCI}$.

As shown by reference number 460, the UE 120 may determine a modified TBS based at least in part on the remaining number of REs. For example, the UE 120 may determine the modified TBS as a function of the MCS and the remaining number of REs. The modified TBS may be smaller than the initial TBS due to the scaling of the number of REs associated with the DCI and the deduction of the number of REs associated with the DCI from the number of REs associated with the DL-SCH to determine the remaining number of REs.

As shown by reference number 470, the BS 110 may transmit, and the UE 120 may receive, the second part of the DCI on the PDSCH. For example, the PDSCH may use the modified TBS for the DL-SCH. The modified TBS may lead to improved performance of transmission of the PDSCH due to a decreased BLER, which reduces communication resource consumption of the BS 110 and the UE 120.

As indicated above, FIG. 4 is provided as an example. Other examples may differ from what is described with respect to FIG. 4.

Figure 5:
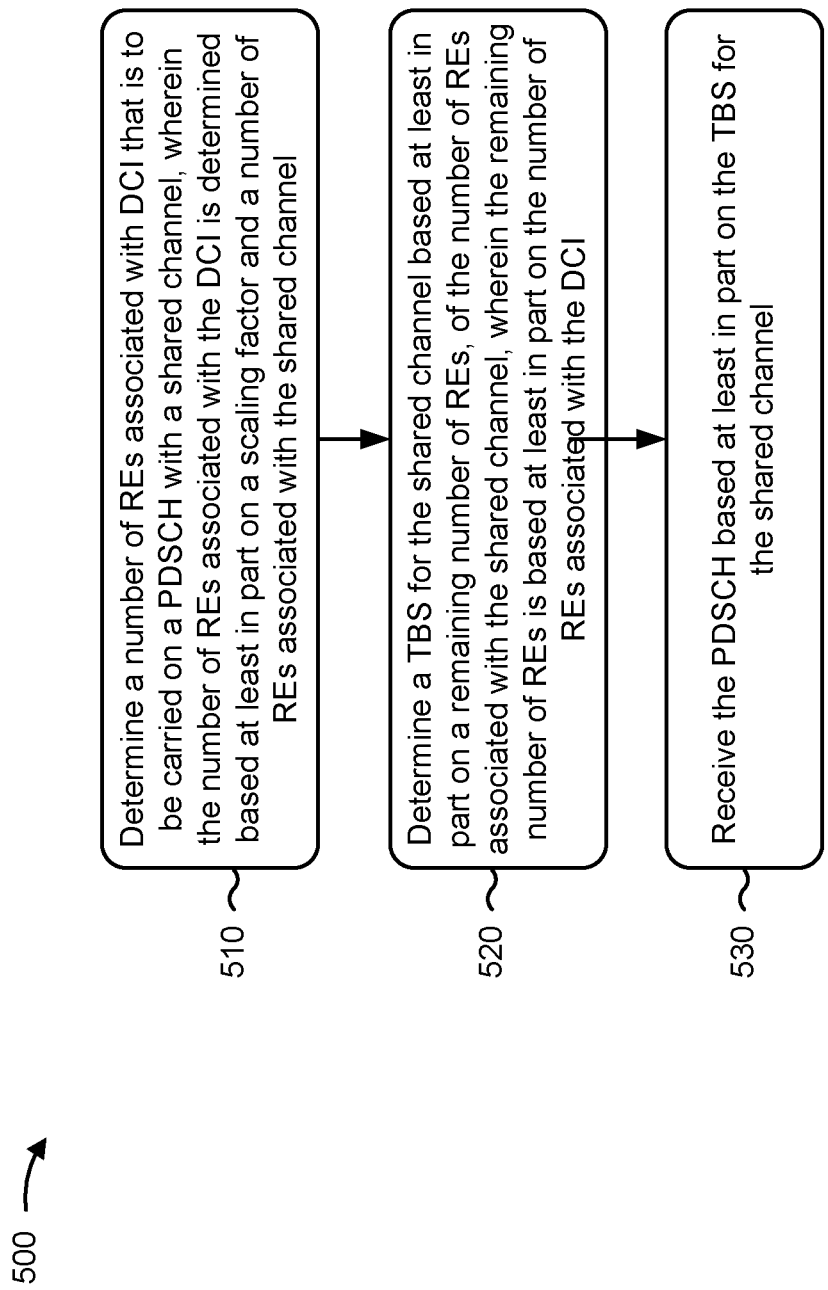
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with rate matching for piggyback DCI.

As shown in FIG. 5, in some aspects, process 500 may include determining a number of REs associated with DCI that is to be carried on a PDSCH with a shared channel, wherein the number of REs associated with the DCI is determined based at least in part on a scaling factor and a number of REs associated with the shared channel (block 510). For example, the UE (e.g., using antenna 252, DEMOD 254, MIMO detector 256, receive processor 258, controller/processor 280, and/or the like) may determine a number of REs associated with DCI that is to be carried on a PDSCH with a shared channel, as described above. In some aspects, the number of REs associated with the DCI is determined based at least in part on a scaling factor and a number of REs associated with the shared channel.

As further shown in FIG. 5, in some aspects, process 500 may include determining a TBS for the shared channel based at least in part on a remaining number of REs, of the number of REs associated with the shared channel, wherein the remaining number of REs is based at least in part on the number of REs associated with the DCI (block 520). For example, the UE (e.g., using antenna 252, DEMOD 254, MIMO detector 256, receive processor 258, controller/processor 280, and/or the like) may determine a TBS for the shared channel based at least in part on a remaining number of REs, of the number of REs associated with the shared channel, as described above. In some aspects, the remaining number of REs is based at least in part on the number of REs associated with the DCI. This TBS may be referred to herein as a modified TBS.

As further shown in FIG. 5, in some aspects, process 500 may include receiving the PDSCH based at least in part on the TBS for the shared channel (block 530). For example, the UE (e.g., using antenna 252, DEMOD 254, MIMO detector 256, receive processor 258, controller/processor 280, and/or the like) may receive the PDSCH based at least in part on the TBS for the shared channel, as described above.

Process 500 may include additional aspects, such as any single aspect or any combination of aspects described below and/or in connection with one or more other processes described elsewhere herein.

In a first aspect, process 500 includes receiving information identifying the scaling factor.

In a second aspect, alone or in combination with the first aspect, the information identifying the scaling factor is received via RRC signaling.

In a third aspect, alone or in combination with one or more of the first and second aspects, the information identifying the scaling factor is received via DCI that schedules the shared channel.

In a fourth aspect, alone or in combination with one or more of the first through third aspects, the TBS is a modified TBS, and the method further comprises: determining an initial TBS based at least in part on the number of REs associated with the shared channel, where the number of REs associated with the DCI is based at least in part on the initial TBS.

In a fifth aspect, alone or in combination with one or more of the first through fourth aspects, the initial TBS is determined based at least in part on an assumption that all allocated REs of the PDSCH are available for the shared channel.

In a sixth aspect, alone or in combination with one or more of the first through fifth aspects, determining the number of REs associated with the DCI further comprises determining the number of REs associated with the DCI based at least in part on combining the scaling factor, a payload size of the DCI, and a payload size of the shared channel.

In a seventh aspect, alone or in combination with one or more of the first through sixth aspects, the number of REs of the DCI is determined to be a multiple of 12.

In an eighth aspect, alone or in combination with one or more of the first through seventh aspects, the number of REs of the DCI is determined so that the DCI occupies an integer number of entire RBs of the PDSCH.

In a ninth aspect, alone or in combination with one or more of the first through eighth aspects, the TBS is a modified TBS, the method further comprises determining an initial TBS based at least in part on the number of REs associated with the shared channel and an MCS of the shared channel, determining the number of REs associated with the DCI comprises determining the number of REs associated with the DCI by combining the number of REs associated with the shared channel, a payload size of the shared channel, a payload size of the DCI, and the scaling factor, the method further comprises: determining the remaining number of REs by subtracting the number of REs associated with the DCI from the number of REs associated with the shared channel, and determining the modified TBS comprises determining the modified TBS based at least in part on the remaining number of REs and the MCS of the shared channel.

In a tenth aspect, alone or in combination with one or more of the first through ninth aspects, process 500 includes determining a size for a code block based at least in part on the initial TBS.

In an eleventh aspect, alone or in combination with one or more of the first through tenth aspects, process 500 includes receiving DCI scheduling the shared channel, wherein the number of REs associated with the shared channel is indicated by the DCI scheduling the shared channel.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
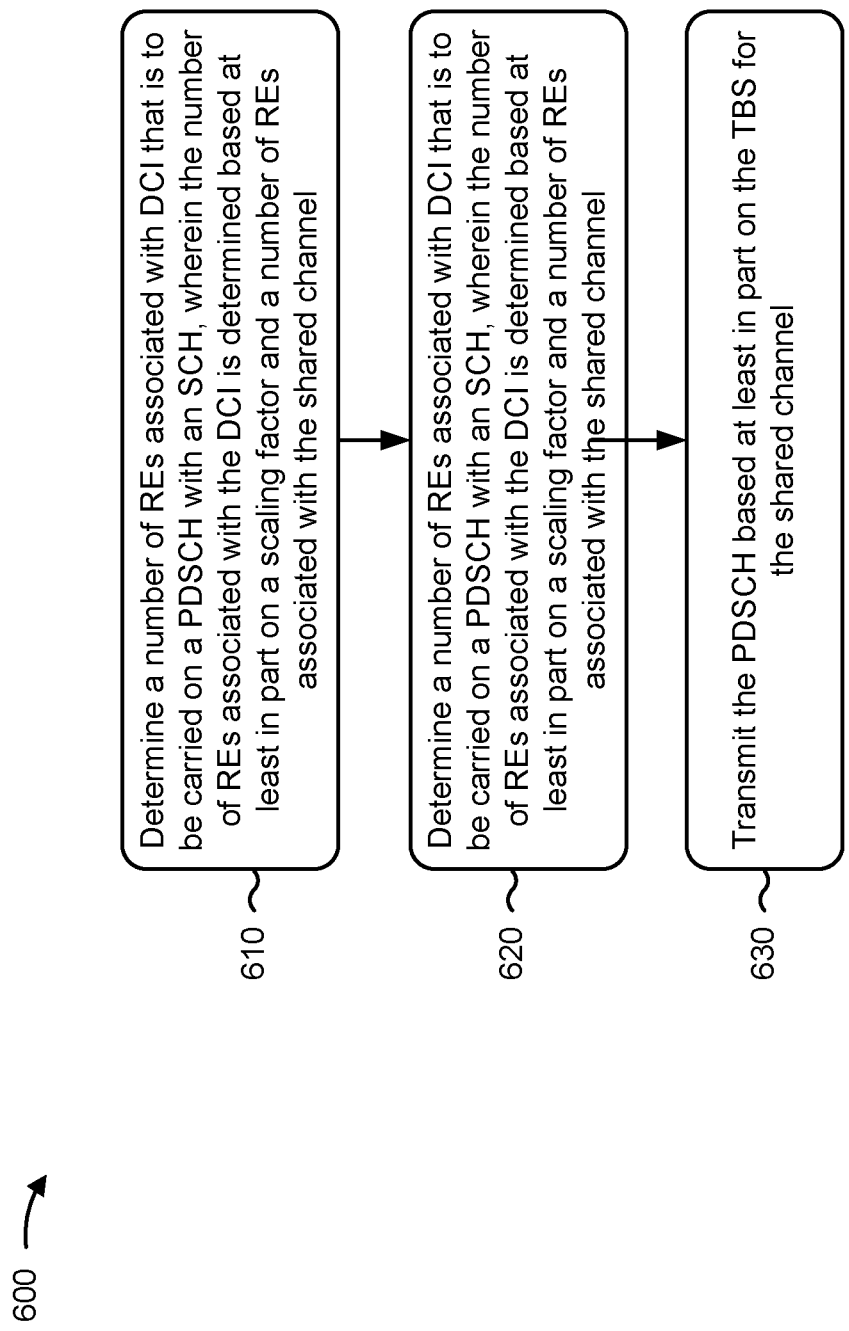
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., BS 110 and/or the like) performs operations associated with rate matching for piggyback DCI.

As shown in FIG. 6, in some aspects, process 600 may include determining a number of REs associated with DCI that is to be carried on a PDSCH with a SCH, wherein the number of REs associated with the DCI is determined based at least in part on a scaling factor and a number of REs associated with the shared channel (block 610). For example, the base station (e.g., using controller/processor 240, transmit processor 220, TX MIMO processor 230, MOD 232, antenna 234, and/or the like) may determine a number of REs associated with DCI that is to be carried on a PDSCH with an SCH, as described above. In some aspects, the number of REs associated with the DCI is determined based at least in part on a scaling factor and a number of REs associated with the SCH.

As further shown in FIG. 6, in some aspects, process 600 may include determining a TBS for the shared channel based at least in part on a remaining number of REs, of the number of REs associated with the shared channel, wherein the remaining number of REs is based at least in part on the number of REs associated with the DCI (block 620). For example, the base station (e.g., using controller/processor 240, transmit processor 220, TX MIMO processor 230, MOD 232, antenna 234, and/or the like) may determine a TBS for the shared channel based at least in part on a remaining number of REs, of the number of REs associated with the shared channel, as described above. In some aspects, the remaining number of REs is based at least in part on the number of REs associated with the DCI.

As further shown in FIG. 6, in some aspects, process 600 may include transmitting the PDSCH based at least in part on the TBS for the shared channel (block 630). For example, the base station (e.g., using controller/processor 240, transmit processor 220, TX MIMO processor 230, MOD 232, antenna 234, and/or the like) may transmit the PDSCH based at least in part on the TBS for the shared channel, as described above.

Process 600 may include additional aspects, such as any single aspect or any combination of aspects described below and/or in connection with one or more other processes described elsewhere herein.

In a first aspect, process 600 includes transmitting information identifying the scaling factor.

In a second aspect, alone or in combination with the first aspect, the information identifying the scaling factor is transmitted via radio resource control signaling.

In a third aspect, alone or in combination with one or more of the first and second aspects, the information identifying the scaling factor is transmitted via DCI that schedules the shared channel.

In a fourth aspect, alone or in combination with one or more of the first through third aspects, the TBS is a modified TBS, and the method further comprises determining an initial TBS based at least in part on the number of REs associated with the shared channel, where the number of REs associated with the DCI is based at least in part on the initial TBS.

In a fifth aspect, alone or in combination with one or more of the first through fourth aspects, the initial TBS is determined as if all allocated REs of the PDSCH are available for the shared channel.

In a sixth aspect, alone or in combination with one or more of the first through fifth aspects, determining the number of REs associated with the DCI further comprises determining the number of REs associated with the DCI based at least in part on combining the scaling factor, a payload size of the DCI, and a payload size of the shared channel.

In a seventh aspect, alone or in combination with one or more of the first through sixth aspects, the number of REs of the DCI is determined to be a multiple of 12.

In an eighth aspect, alone or in combination with one or more of the first through seventh aspects, the number of REs of the DCI is determined so that the DCI occupies an integer number of entire RB of the PDSCH.

In a ninth aspect, alone or in combination with one or more of the first through eighth aspects, the TBS is a modified TBS, and the method further comprises determining an initial TBS based at least in part on the number of REs associated with the shared channel and an MCS of the shared channel, determining the number of REs associated with the DCI comprises determining the number of REs associated with the DCI by combining the number of REs associated with the shared channel, a payload size of the shared channel, a payload size of the DCI, and the scaling factor, the method further comprises determining the remaining number of REs by subtracting the number of REs associated with the DCI from the number of REs associated with the shared channel, and determining the modified TBS comprises determining the modified TB S based at least in part on the remaining number of REs and the MCS of the shared channel.

In a tenth aspect, alone or in combination with one or more of the first through ninth aspects, process 600 includes determining a size for a code block based at least in part on the initial TBS.

In an eleventh aspect, alone or in combination with one or more of the first through tenth aspects, process 600 includes transmitting DCI scheduling the shared channel, wherein the number of REs associated with the shared channel is indicated by the DCI scheduling the shared channel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: determining a number of resource elements (REs) associated with downlink control information (DCI) that is to be carried on a physical downlink shared channel (PDSCH) with a shared channel, wherein the number of REs associated with the DCI is determined based at least in part on a scaling factor and a number of REs associated with the shared channel; determining a transport block size (TBS) for the shared channel based at least in part on a remaining number of REs, of the number of REs associated with the shared channel, wherein the remaining number of REs is based at least in part on the number of REs associated with the DCI; and receiving the PDSCH based at least in part on the TBS for the shared channel.

Aspect 2: The method of Aspect 1, further comprising: receiving information identifying the scaling factor.

Aspect 3: The method of Aspect 2, wherein the information identifying the scaling factor is received via radio resource control (RRC) signaling.

Aspect 4: The method of Aspect 2, wherein the information identifying the scaling factor is received via DCI that schedules the shared channel.

Aspect 5: The method of any of Aspects 1-4, wherein the TBS is a modified TBS, and wherein the method further comprises: determining an initial TBS based at least in part on the number of REs associated with the shared channel, wherein the number of REs associated with the DCI is based at least in part on the initial TBS.

Aspect 6: The method of Aspect 5, wherein the initial TBS is determined based at least in part on an assumption that all allocated REs of the PDSCH are available for the shared channel.

Aspect 7: The method of any of Aspects 1-6, wherein determining the number of REs associated with the DCI further comprises: determining the number of REs associated with the DCI based at least in part on combining the scaling factor, a payload size of the DCI, and a payload size of the shared channel.

Aspect 8: The method of any of Aspects 1-7, wherein the number of REs of the DCI is determined to be a multiple of 12.

Aspect 9: The method of any of Aspects 1-8, wherein the number of REs of the DCI is determined so that the DCI occupies an integer number of entire RBs of the PDSCH.

Aspect 10: The method of any of Aspects 1-9, wherein the TBS is a modified TBS, and wherein the method further comprises: determining an initial TBS based at least in part on the number of REs associated with the shared channel and a modulation and coding scheme (MCS) of the shared channel, wherein determining the number of REs associated with the DCI comprises determining the number of REs associated with the DCI by combining the number of REs associated with the shared channel, a payload size of the shared channel, a payload size of the DCI, and the scaling factor, wherein the method further comprises: determining the remaining number of REs by subtracting the number of REs associated with the DCI from the number of REs associated with the shared channel, and wherein determining the modified TBS comprises determining the modified TBS based at least in part on the remaining number of REs and the MCS of the shared channel.

Aspect 11: The method of Aspect 10, further comprising: determining a size for a code block based at least in part on the initial TBS.

Aspect 12: The method of any of Aspects 1-11, further comprising: receiving DCI scheduling the shared channel, wherein the number of REs associated with the shared channel is indicated by the DCI scheduling the shared channel.

Aspect 13: A method of wireless communication performed by a base station, comprising: determining a number of resource elements (REs) associated with downlink control information (DCI) that is to be carried on a physical downlink shared channel (PDSCH) with a shared channel (SCH), wherein the number of REs associated with the DCI is determined based at least in part on a scaling factor and a number of REs associated with the shared channel; determining a transport block size (TBS) for the shared channel based at least in part on a remaining number of REs, of the number of REs associated with the shared channel, wherein the remaining number of REs is based at least in part on the number of REs associated with the DCI; and transmitting the PDSCH based at least in part on the TBS for the shared channel.

Aspect 14: The method of Aspect 13, further comprising: transmitting information identifying the scaling factor.

Aspect 15: The method of Aspect 14, wherein the information identifying the scaling factor is transmitted via radio resource control signaling.

Aspect 16: The method of Aspect 14, wherein the information identifying the scaling factor is transmitted via DCI that schedules the shared channel.

Aspect 17: The method of any of Aspects 13-16, wherein the TBS is a modified TBS, and wherein the method further comprises: determining an initial TBS based at least in part on the number of REs associated with the shared channel, wherein the number of REs associated with the DCI is based at least in part on the initial TBS.

Aspect 18: The method of Aspect 17, wherein the initial TBS is determined as if all allocated REs of the PDSCH are available for the shared channel.

Aspect 19: The method of any of Aspects 13-18, wherein determining the number of REs associated with the DCI further comprises: determining the number of REs associated with the DCI based at least in part on combining the scaling factor, a payload size of the DCI, and a payload size of the shared channel.

Aspect 20: The method of any of Aspects 13-19, wherein the number of REs of the DCI is determined to be a multiple of 12.

Aspect 21: The method of any of Aspects 13-20, wherein the number of REs of the DCI is determined so that the DCI occupies an integer number of entire RB of the PDSCH.

Aspect 22: The method of any of Aspects 13-21, wherein the TBS is a modified TBS, and wherein the method further comprises: determining an initial TBS based at least in part on the number of REs associated with the shared channel and a modulation and coding scheme (MCS) of the shared channel, wherein determining the number of REs associated with the DCI comprises determining the number of REs associated with the DCI by combining the number of REs associated with the shared channel, a payload size of the shared channel, a payload size of the DCI, and the scaling factor, wherein the method further comprises: determining the remaining number of REs by subtracting the number of REs associated with the DCI from the number of REs associated with the shared channel, and wherein determining the modified TBS comprises determining the modified TBS based at least in part on the remaining number of REs and the MCS of the shared channel.

Aspect 23: The method of Aspect 22, further comprising: determining a size for a code block based at least in part on the initial TBS.

Aspect 24: The method of any of Aspects 13-23, further comprising: transmitting DCI scheduling the shared channel, wherein the number of REs associated with the shared channel is indicated by the DCI scheduling the shared channel.

Aspect 25: An apparatus for wireless communication at a device, comprising a processor; memory coupled with the processor; and instructions stored in the memory and executable by the processor to cause the apparatus to perform the method of one or more Aspects of Aspects 1-24.

Aspect 26: A device for wireless communication, comprising a memory and one or more processors coupled to the memory, the memory and the one or more processors configured to perform the method of one or more Aspects of Aspects 1-24.

Aspect 27: An apparatus for wireless communication, comprising at least one means for performing the method of one or more Aspects of Aspects 1-24.

Aspect 28: A non-transitory computer-readable medium storing code for wireless communication, the code comprising instructions executable by a processor to perform the method of one or more Aspects of Aspects 1-24.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining a number of resource elements (REs) associated with downlink control information (DCI) that is to be carried on a physical downlink shared channel (PDSCH) with a shared channel, wherein the number of REs associated with the DCI is determined based at least in part on combining a number of REs associated with the shared channel, a payload size of the shared channel, a payload size of the DCI, and a scaling factor for scaling a total number of REs of a resource allocation for the DCI;
   determining a remaining number of REs, of the number of REs associated with the shared channel, by subtracting the number of REs associated with the DCI from the number of REs associated with the shared channel;
   determining a transport block size (TBS) for the shared channel based at least in part on the remaining number of REs, of the number of REs associated with the shared channel, wherein the TBS for the shared channel is a modified TBS;
wherein determining the TBS for the shared channel further comprises:
determining an initial TBS based at least in part on the number of REs associated with the shared channel and a modulation and coding scheme (MCS) of the shared channel; and
wherein the modified TBS is determined based at least in part on the remaining number of REs and the MCS of the shared channel;
and
receiving the PDSCH based at least in part on the TBS for the shared channel.

2. The method of claim 1, further comprising:
receiving information identifying the scaling factor.

3. The method of claim 2, wherein the information identifying the scaling factor is received via radio resource control (RRC) signaling.

4. The method of claim 2, wherein the information identifying the scaling factor is received via DCI that schedules the shared channel.

5. The method of claim 1,
wherein the number of REs associated with the DCI is based at least in part on the initial TBS.

6. The method of claim 5, wherein the initial TBS is determined based at least in part on an assumption that all allocated REs of the PDSCH are available for the shared channel.

7. The method of claim 1, wherein the number of REs of the DCI is determined to be a multiple of 12.

8. The method of claim 1, wherein the number of REs of the DCI is determined so that the DCI occupies an integer number of entire RBs of the PDSCH.

9. The method of claim 1, further comprising:
determining a size for a code block based at least in part on the initial TBS.

10. The method of claim 1, further comprising:
receiving DCI scheduling the shared channel, wherein the number of REs associated with the shared channel is indicated by the DCI scheduling the shared channel.

11. A method of wireless communication performed by a network entity, comprising:
determining a number of resource elements (REs) associated with downlink control information (DCI) that is to be carried on a physical downlink shared channel (PDSCH) with a shared channel (SCH), wherein the number of REs associated with the DCI is determined based at least in part on combining a number of REs associated with the shared channel, a payload size of the shared channel, a payload size of the DCI, and a scaling factor for scaling a total number of REs of a resource allocation for the DCI;
determining a remaining number of REs, of the number of REs associated with the shared channel, by subtracting the number of REs associated with the DCI from the number of REs associated with the shared channel;
determining a transport block size (TBS) for the shared channel based at least in part on the remaining number of REs, of the number of REs associated with the shared channel, wherein the TBS for the shared channel is a modified TBS;
wherein determining the TBS for the shared channel further comprises:
determining an initial TBS based at least in part on the number of REs associated with the shared channel and a modulation and coding scheme (MCS) of the shared channel; and
wherein the modified TBS is determined based at least in part on the remaining number of REs and the MCS of the shared channel;
and
transmitting the PDSCH based at least in part on the TBS for the shared channel.

12. The method of claim 11, further comprising:
transmitting information identifying the scaling factor.

13. The method of claim 12, wherein the information identifying the scaling factor is transmitted via radio resource control signaling.

14. The method of claim 12, wherein the information identifying the scaling factor is transmitted via DCI that schedules the shared channel.

15. The method of claim 11,
wherein the number of REs associated with the DCI is based at least in part on the initial TBS.

16. The method of claim 15, wherein the initial TBS is determined as if all allocated REs of the PDSCH are available for the shared channel.

17. The method of claim 11, wherein the number of REs of the DCI is determined to be a multiple of 12.

18. The method of claim 11, wherein the number of REs of the DCI is determined so that the DCI occupies an integer number of entire RB of the PDSCH.

19. The method of claim 11, further comprising:
determining a size for a code block based at least in part on the initial TBS.

20. The method of claim 11, further comprising:
transmitting DCI scheduling the shared channel, wherein the number of REs associated with the shared channel is indicated by the DCI scheduling the shared channel.

21. A user equipment (UE) for wireless communication, comprising:
a memory; and
one or more processors coupled to the memory, the one or more processors configured to:
determine a number of resource elements (REs) associated with downlink control information (DCI) that is to be carried on a physical downlink shared channel (PDSCH) with a shared channel, wherein the number of REs associated with the DCI is determined based at least in part on combining a number of REs associated with the shared channel, a payload size of the shared channel, a payload size of the DCI, and a scaling factor for scaling a total number of REs of a resource allocation for the DCI;
determine a remaining number of REs, of the number of REs associated with the shared channel, by subtracting the number of REs associated with the DCI from the number of REs associated with the shared channel;
determine a transport block size (TBS) for the shared channel based at least in part on the remaining number of REs, of the number of REs associated with the shared channel, wherein the TBS for the shared channel is a modified TBS;
wherein the one or more processors configured to determine the TBS for the shared channel is further configured to:
determine an initial TBS based at least in part on the number of REs associated with the shared channel and a modulation and coding scheme (MCS) of the shared channel; and wherein the modified TBS is determined based at least in part on the remaining number of REs and the MCS of the shared channel;

and receive the PDSCH based at least in part on the TBS for the shared channel.

22. The UE of claim 21, wherein the one or more processors are configured to:

receive information identifying the scaling factor.

23. The UE of claim 22, wherein the information identifying the scaling factor is received via radio resource control (RRC) signaling.

24. The UE of claim 21, wherein the number of REs associated with the DCI is based at least in part on the initial TBS.

25. A network entity for wireless communication, comprising:

a memory; and one or more processors coupled to the memory, the one or more processors configured to:

determine a number of resource elements (REs) associated with downlink control information (DCI) that is to be carried on a physical downlink shared channel (PDSCH) with a shared channel (SCH), wherein the number of REs associated with the DCI is determined based at least in part on combining a number of REs associated with the shared channel, a payload size of the shared channel, a payload size of the DCI, and a scaling factor for scaling a total number of REs of a resource allocation for the DCI;

determine a remaining number of REs, of the number of REs associated with the shared channel, by subtracting the number of REs associated with the DCI from the number of REs associated with the shared channel;

determine a transport block size (TBS) for the shared channel based at least in part on the remaining number of REs, of the number of REs associated with the shared channel, wherein the TBS for the shared channel is a modified TBS;

wherein the one or more processors configured to determine the TBS for the shared channel is further configured to:

determine an initial TBS based at least in part on the number of REs associated with the shared channel and a modulation and coding scheme (MCS) of the shared channel; and wherein the modified TBS is determined based at least in part on the remaining number of REs and the MCS of the shared channel;

and transmit the PDSCH based at least in part on the TBS for the shared channel.

26. The network entity of claim 25, wherein the number of REs associated with the DCI is based at least in part on the initial TBS.

\* \* \* \* \*